United States Patent
Li et al.

(10) Patent No.: US 10,599,195 B2
(45) Date of Patent: Mar. 24, 2020

(54) METHOD AND APPARATUS FOR CONTROLLING HOT PLUG OPERATION OF CPU IN MOBILE TERMINAL

(71) Applicant: ZTE CORPORATION, Guangdong (CN)

(72) Inventors: Hujun Li, Guangdong (CN); Hongxia Liu, Guangdong (CN); Yingfang Chen, Guangdong (CN)

(73) Assignee: ZTE Corporation, Shenzhen, Guangdon (CN)

(*) Notice: Subject to any disclaimer, the term of this patent is extended or adjusted under 35 U.S.C. 154(b) by 16 days.

(21) Appl. No.: 15/744,260

(22) PCT Filed: Dec. 16, 2015

(86) PCT No.: PCT/CN2015/097609
§ 371 (c)(1),
(2) Date: Jan. 12, 2018

(87) PCT Pub. No.: WO2016/165372
PCT Pub. Date: Oct. 20, 2016

(65) Prior Publication Data
US 2018/0203494 A1     Jul. 19, 2018

(30) Foreign Application Priority Data
Jul. 29, 2015   (CN) .......................... 2015 1 0456264

(51) Int. Cl.
*G06F 1/20*      (2006.01)
*G06F 1/3206*    (2019.01)

(52) U.S. Cl.
CPC ............ *G06F 1/206* (2013.01); *G06F 1/3206* (2013.01)

(58) Field of Classification Search
CPC ... G06F 1/206; G06F 1/26; G06F 1/32; G06F 1/3203; G06F 1/3206; G06F 1/324
(Continued)

(56) References Cited

U.S. PATENT DOCUMENTS 6,453,130 B1 * 9/2002 Richtsmeier ....... G03G 15/2039
                                                    219/216
9,075,611 B2 7/2015 Tan et al.
(Continued)

FOREIGN PATENT DOCUMENTS

CN     101685894 A     3/2010
CN     102033588 A     4/2011
(Continued)

OTHER PUBLICATIONS

International Search Report dated May 5, 2016 for International Application No. PCT/CN2015/097609, 8 pages.
(Continued)

*Primary Examiner* — Faisal M Zaman
(74) *Attorney, Agent, or Firm* — Knobbe Martens Olson and Bear

(57) ABSTRACT

Provided are a method and apparatus for controlling a hot plug operation of a CPU in a mobile terminal. The method includes: adjusting (101) at least one temperature threshold of the CPU when detecting that a number of hot plug operations of the CPU within a preset period is greater than a preset threshold, where the temperature threshold is used for controlling the hot plug operations of the CPU; and controlling (102) the hot plug operation of the CPU by use of the adjusted temperature threshold.

18 Claims, 2 Drawing Sheets

---

Adjust at least one temperature threshold of a CPU when it is detected that a number of hot plug operations of the CPU within a preset period is greater than a preset threshold — 101

Control the hot plug operation of the CPU by use of the adjusted temperature threshold — 102

(58) Field of Classification Search
USPC .................. 713/322, 300, 320; 710/302
See application file for complete search history.

(56) References Cited

U.S. PATENT DOCUMENTS

| | | | |
|---|---|---|---|
| 2003/0110423 A1* | 6/2003 | Helms | G06F 1/206 714/100 |
| 2004/0088593 A1* | 5/2004 | Park | G06F 1/206 713/322 |
| 2004/0243857 A1* | 12/2004 | Watnik | G06F 1/206 713/300 |
| 2005/0289376 A1* | 12/2005 | Hartman | G06F 1/206 713/320 |
| 2007/0027580 A1* | 2/2007 | Ligtenberg | G05D 23/19 700/300 |
| 2007/0097620 A1* | 5/2007 | Leech | G06F 1/20 361/679.54 |
| 2009/0030644 A1* | 1/2009 | Johns | G01K 3/005 702/130 |
| 2012/0110352 A1 | 5/2012 | Branover et al. | |
| 2013/0159741 A1* | 6/2013 | Schluessler | G06F 1/3253 713/320 |
| 2014/0075223 A1 | 3/2014 | Tan et al. | |
| 2014/0240031 A1* | 8/2014 | Vadakkanmaruveedu | G06F 1/206 327/512 |
| 2014/0245029 A1* | 8/2014 | Jain | G06F 1/1632 713/300 |
| 2015/0066420 A1* | 3/2015 | Moore | G06F 1/206 702/132 |
| 2015/0106640 A1 | 4/2015 | Brackman et al. | |
| 2015/0156917 A1 | 6/2015 | Ogawa et al. | |
| 2015/0194969 A1* | 7/2015 | Kawabe | H03L 7/00 327/114 |
| 2015/0331462 A1* | 11/2015 | Atkinson | G06F 3/044 713/100 |
| 2015/0333758 A1 | 11/2015 | Gomi et al. | |
| 2015/0346796 A1 | 12/2015 | Tan et al. | |
| 2016/0037678 A1* | 2/2016 | Tan | G05D 23/19 361/679.46 |
| 2016/0147280 A1* | 5/2016 | Thomas | G06F 1/206 |
| 2016/0266628 A1* | 9/2016 | Jain | G06F 1/28 |
| 2016/0266629 A1* | 9/2016 | Merrikh | G06F 1/28 |
| 2016/0274629 A1* | 9/2016 | Lovicott | G06F 1/206 |
| 2018/0203494 A1* | 7/2018 | Li | G06F 1/206 |

FOREIGN PATENT DOCUMENTS

| | | |
|---|---|---|
| CN | 102609062 A | 7/2012 |
| CN | 104460942 A | 3/2015 |
| JP | 2007233782 A | 9/2007 |
| WO | 2014/037988 A1 | 3/2014 |
| WO | 2014/097362 A1 | 6/2014 |

OTHER PUBLICATIONS

Written Opinion of the International Searching Authority dated May 5, 2016 for International Application No. PCT/CN2015/097609, 3 pages.

Extended European Search Report dated Jun. 7, 2019 for European Patent Application No. EP 15 889 068.1, and which shares priority of Chinese Patent Application No. CN 201510456264.2 with subject U.S. Appl. No. 15/744,260.

* cited by examiner

METHOD AND APPARATUS FOR CONTROLLING HOT PLUG OPERATION OF CPU IN MOBILE TERMINAL

CROSS REFERENCE TO RELATED APPLICATIONS

This application is the U.S. National Phase Application under 35 U.S.C. § 371 of International Application No. PCT/CN2015/097609 filed on Dec. 16, 2015, designating the U.S. and published as WO 2016/165372 A1 on Oct. 20, 2016, which claims the benefit of Chinese Patent Application No. 201510456264.2, filed on Jul. 29, 2015, which are hereby incorporated by reference in their entirety.

TECHNICAL FIELD

The present application relates to, but is not limited to, the field of communications.

BACKGROUND

Currently, a mobile phone has more and more cores and emits much more heat. The temperature of each CPU in a chip is detected by a temperature sensor. For example, two temperature thresholds (i.e., T1 and T2) are set in relation to the temperature of one CPU. When the temperature reaches T2, at least one core of the CPU is disabled; when the temperature reaches T1, at least one core of the CPU is enabled. More specifically, when the temperature rises to T2, the CPU is underclocked or at least one core of the CPU is disabled gradually (e.g., for a CPU having 8 cores, several cores are disabled gradually); when the temperature drops to T1, the at least one disabled core of the CPU are re-enabled (until all the 8 cores are in operation). This causes frequent enabling and disabling of at least one core of the CPU, leading to a waste of system resources and a potential risk in system stability.

SUMMARY

The following is a summary of a subject matter described herein in detail. This summary is not intended to limit the scope of the claims.

A method and apparatus for controlling a hot plug operation of a CPU in a mobile terminal are provided to reduce frequent enabling and disabling of at least one core of the CPU.

A method for controlling a hot plug operation of a CPU in a mobile terminal includes the following steps:

at least one temperature threshold of a CPU is adjusted when it is detected that a number of hot plug operations of the CPU within a preset period is greater than a preset threshold, where the temperature threshold is used for controlling the hot plug operation of the CPU;

the hot plug operation of the CPU is controlled by use of the adjusted temperature threshold.

In an exemplary embodiment, the temperature threshold of the CPU is adjusted as follows:

at least one of a temperature threshold T1 and a temperature threshold T2 of the CPU is adjusted, where the temperature threshold T1 and the temperature threshold T2 are greater than 0, and the temperature threshold T1 is less than the temperature threshold T2.

In an exemplary embodiment, the temperature threshold of the CPU is adjusted as follows:

a temperature threshold T1 of the CPU is decreased and/or a temperature threshold T2 of the CPU is increased, where the temperature threshold T1 and the temperature threshold T2 are greater than 0, and the temperature threshold T1 is less than the temperature threshold T2.

In an exemplary embodiment, the temperature threshold of the CPU is adjusted as follows:

the temperature threshold of the CPU is adjusted according to a preset local value adjustment strategy; or operation information about the operation of adjusting the temperature threshold of the CPU is outputted, and an operation result fed back for the operation information is received so that the adjusted temperature threshold is obtained.

In an exemplary embodiment, when the operation information about the operation of adjusting the temperature threshold of the CPU is outputted, the method further includes:

prompt information about an operation of adjusting data of the temperature threshold is outputted, where the prompt information includes a direction of adjusting a value of the temperature threshold and a magnitude of adjusting the value of the temperature threshold.

An apparatus for controlling a hot plug operation of a CPU in a mobile terminal includes an adjustment module and a control module.

The adjustment module is configured to adjust at least one temperature threshold of a CPU when detecting that a number of hot plug operations of the CPU within a preset period is greater than a preset threshold, where the temperature threshold is used for controlling the hot plug operation of the CPU.

The control module is configured to control the hot plug operation of the CPU by use of the adjusted temperature threshold.

In an exemplary embodiment, the adjustment module is configured to adjust at least one of a temperature threshold T1 and a temperature threshold T2 of the CPU, where the temperature threshold T1 and the temperature threshold T2 are greater than 0, and the temperature threshold T1 is less than the temperature threshold T2.

In an exemplary embodiment, the adjustment module is configured to decrease a temperature threshold T1 of the CPU and/or increase a temperature threshold T2 of the CPU, where the temperature threshold T1 and the temperature threshold T2 are greater than 0, and the temperature threshold T1 is less than the temperature threshold T2.

In an exemplary embodiment, the adjustment module is configured to obtain a prestored value adjustment strategy, and adjust the temperature threshold of the CPU according to the value adjustment strategy; or output operation information about the operation of adjusting the temperature threshold of the CPU and receive an operation result fed back for the operation information to obtain the adjusted temperature threshold.

In an exemplary embodiment, the adjustment module further includes an output unit.

The output unit is configured to output prompt information about an operation of adjusting data of the temperature threshold when outputting the operation information about the operation of adjusting the temperature threshold of the CPU, where the prompt information includes a direction of adjusting a value of the temperature threshold and a magnitude of adjusting the value of the temperature threshold.

A computer-readable storage medium is configured to store computer-executable instructions for executing any method described above.

In embodiments of the present disclosure, in a case of frequent hot plug operations of a CPU, at least one temperature threshold is adjusted so that a trigger condition of a hot plug operation is changed and the number of hot plug operations reaches a further value. This overcomes a problem of frequent enabling and disabling of at least one core of the CPU in the related art, ensures rational use of CPU resources and ensures system stability.

Other aspects of the present disclosure can be understood after the accompanying drawings and detailed description are read and understood.

DETAILED DESCRIPTION

Embodiments of the present disclosure will be described below with reference to the accompanying drawings. If not in collision, the embodiments described herein and the features thereof may be combined with each other.

Figure 1:
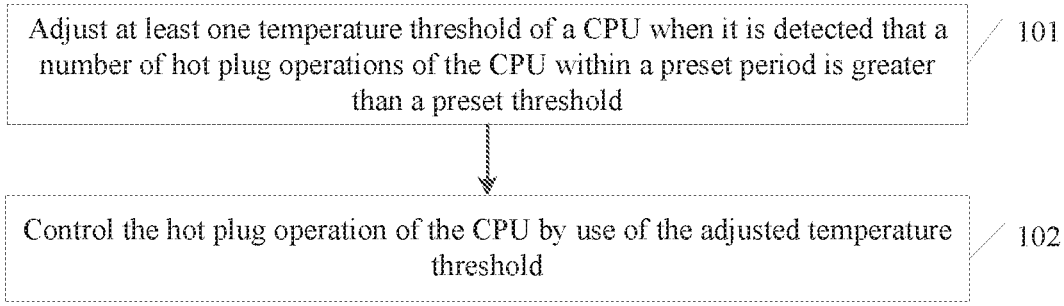
FIG. 1 is a flowchart of a method for controlling a hot plug operation of a CPU in a mobile terminal according to embodiments of the present disclosure.

FIG. 1 is a flowchart of a method for controlling a hot plug operation of a CPU in a mobile terminal according to embodiments of the present disclosure. The method illustrated in FIG. 1 includes the steps described below.

In step 101, at least one temperature threshold of a CPU is adjusted when it is detected that a number of hot plug operations of the CPU within a preset period is greater than a preset threshold, where the temperature threshold is used for controlling the hot plug operation of the CPU.

In step 102, the hot plug operation of the CPU is controlled by use of the adjusted temperature threshold.

In method embodiments of the present disclosure, in a case of frequent hot plug operations of a CPU, at least one temperature threshold is adjusted so that a trigger condition of a hot plug operation is changed and the number of hot plugs reaches a further value. This overcomes a problem of frequent enabling and disabling of at least one core of the CPU in the related art, ensures rational use of CPU resources and ensures system stability.

The following is a further explanation of the method provided by embodiments of the present disclosure.

The temperature threshold of the CPU is adjusted as follows:

at least one of a temperature threshold T1 and a temperature threshold T2 of the CPU is adjusted, where the temperature threshold T1 and the temperature threshold T2 are greater than 0, and the temperature threshold T1 is less than the temperature threshold T2.

Two temperature thresholds (i.e., T1 and T2) are set in relation to the temperature of one CPU. When the temperature reaches the temperature threshold T2, at least one core of the CPU is disabled; when the temperature reaches the temperature threshold T1, at least one core of the CPU is enabled. Therefore, in practical use, a trigger condition of enabling at least one core of the CPU may be controlled through an adjustment of the temperature threshold T1, and a trigger condition of disabling at least one core of the CPU may be controlled through an adjustment of the temperature threshold T2. Of course, both the temperature thresholds T1 and the T2 may be adjusted to control the trigger condition of enabling at least one core of the CPU and the trigger condition of disabling at least one core of the CPU.

The temperature threshold of the CPU is adjusted as follows:

the temperature threshold T1 of the CPU is reduced and/or the temperature threshold T2 of the CPU is increased, where the temperature threshold T1 and the temperature threshold T2 are greater than 0, and the temperature threshold T1 is less than the temperature threshold T2.

The temperature threshold T1 is decreased to effectively delay in enabling at least one core of the CPU. The temperature threshold T2 is increased to effectively delay in disabling at least one core of the CPU.

The temperature threshold of the CPU is adjusted as follows:

the temperature threshold of the CPU is adjusted according to a preset local value adjustment strategy; or operation information about the operation of adjusting the temperature threshold of the CPU is outputted and an operation result fed back for the operation information is received so that the adjusted temperature threshold is obtained.

In practical use, the adjustment may be made by the mobile terminal itself or may be made externally. In this way, the temperature threshold is managed.

In addition, when the operation information about the operation of adjusting the temperature threshold of the CPU is outputted, prompt information about an operation of adjusting data of the temperature threshold is outputted, where the prompt information includes a direction of adjusting a value of the temperature threshold and a magnitude of adjusting the value of the temperature threshold.

The direction of adjusting the data of the temperature threshold is increasing or decreasing.

The prompt information is outputted so that the temperature threshold is accurately adjusted externally, providing an accurate basis for subsequent management.

The following embodiments further describe the above method.

Embodiment 1 (Automatic Adjustment)

Figure 2:
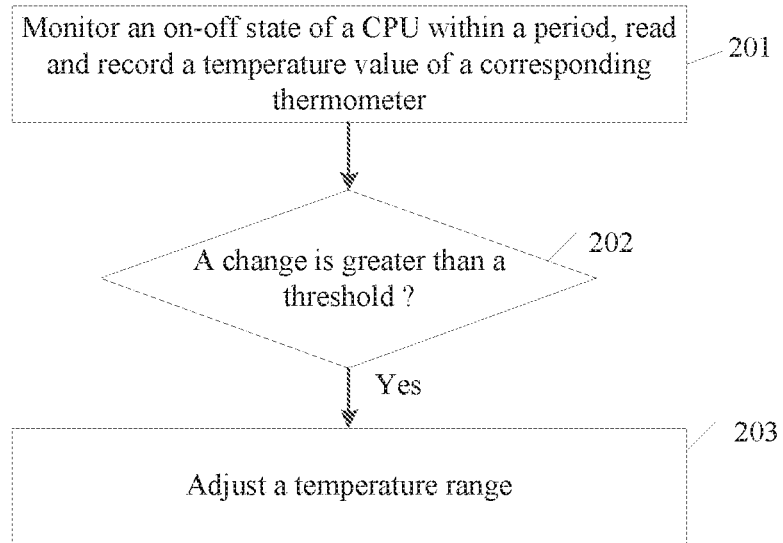
FIG. 2 is a flowchart of a method for controlling a hot plug operation of a CPU in a mobile terminal according to an embodiment 1 of the present disclosure.

FIG. 2 is a flowchart of a method for controlling a hot plug operation of a CPU in a mobile terminal according to an embodiment 1 of the present disclosure. The method illustrated in FIG. 2 includes the steps described below.

In step 201, a change of an on-off state of a CPU within a period is monitored.

In step 202, if the change of the on-off state within a period is greater than a threshold, the method goes to step 203.

In this step, the period or the number of hot plug operations may be manually adjusted or selected. For example, in a scenario 1, the period is 5 minutes, and the number of hot plug operations is greater than 50; and in a scenario 2, the period is 1 minute, and the number of hot plug operations is greater than 7, where a sampling frequency is one sampling per second or one sampling in each manually set period.

This step may include: starting sampling, collecting a hot plug state of each CPU according to the set sampling frequency; collecting a temperature value of the thermometer for temperature controlling corresponding to each CPU; and if the sampling time is up, ending the current sampling and performing calculation. In the example of the scenario 2, the collection is performed for 1 minute. If a CPU performs more than 7 hot plug operations, the temperature range (T1, T2) of the CPU needs to be adjusted according to a step size. In general, to control the temperature of a mobile phone, the temperature threshold T1 is adjusted; if hot plug operations are performed frequently, the magnitude of the adjustment is larger. For example, T1_new=T1−2 degrees.

The adjustment strategy for the temperature range of multiple CPUs is as follows: if the step size is relatively small, it is feasible to adjust only the temperature range of the CPU that undergoes the most frequent hot plug operations, and, according to the sampling period, hot plug operations of each CPU are gradually made less frequent.

In step 203, the corresponding temperature range is increased according to a specified step size; the monitoring data is cleared and the method goes to step 101.

Embodiment 2 (Manual Adjustment, or Selection According to a Recommended Value)

Figure 3:
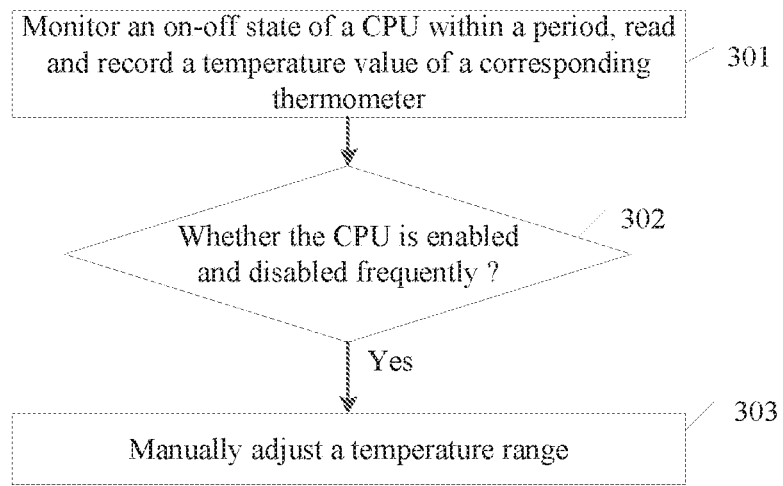
FIG. 3 is a flowchart of a method for controlling a hot plug operation of a CPU in a mobile terminal according to an embodiment 2 of the present disclosure.

FIG. 3 is a flowchart of a method for controlling a hot plug operation of a CPU in a mobile terminal according to an embodiment 2 of the present disclosure. The method illustrated in FIG. 3 includes the steps described below.

In step 301, a change of an on-off state of a CPU within a period of time is monitored, and a corresponding temperature value is read.

In step 302, if the change of the on-off state within a period is greater than a threshold, an alarm is reported and the method goes to step 303.

Here, because the adjustment is performed manually, if a user finds a state of frequent hot plug operations, the user may select several system-recommended configuration options. For example, in an option 1, the lower limit of the temperature range of the CPU that undergoes the most frequent hot plug operations is decreased by 2 degrees; in an option 2, the lower limits of the temperature ranges of the two CPUs that undergo the most frequent hot plug operations are decreased by 2 degrees; or the user may select one or more thermometer ranges (T1, T2) corresponding to one or more CPUs. In general, the temperature threshold T2 is adjusted to a value greater than a default value of the system, and it is needed to explain to the user that the temperature of the device may increase in use.

In step 303, the temperature range is manually adjusted, the monitoring data is cleared and the method goes to step 301.

It can be seen from the above that, by obtaining a running state of a CPU, when detecting that the CPU is frequently enabled and disabled, it is feasible to report an alarm, or to automatically adjust a temperature range, or to manually adjust the temperature range, or to select a corresponding recommended value.

Figure 4:
FIG. 4 is a structure diagram of an apparatus for controlling a hot plug operation of a CPU in a mobile terminal according to embodiments of the present disclosure.

FIG. 4 is a structure diagram of an apparatus for controlling a hot plug operation of a CPU in a mobile terminal according to embodiments of the present disclosure. As illustrated in FIG. 4, the apparatus includes an adjustment module 401 and a control module 402.

The adjustment module 401 is configured to adjust at least one temperature threshold of a CPU when detecting that a number of hot plug operations of the CPU within a preset period is greater than a preset threshold, where the temperature threshold is used for controlling the hot plug operation of the CPU.

The control module 402 is configured to control the hot plug operation of the CPU by use of the adjusted temperature threshold.

The adjustment module 401 is configured to adjust at least one of a temperature threshold T1 and a temperature threshold T2 of the CPU, where the temperature threshold T1 and the temperature threshold T2 are greater than 0, and the temperature threshold T1 is less than the temperature threshold T2.

The adjustment module 401 is configured to decrease the temperature threshold T1 of the CPU and/or increase the temperature threshold T2 of the CPU, where the temperature threshold T1 and the temperature threshold T2 are greater than 0, and the temperature threshold T1 is less than the temperature threshold T2.

The adjustment module 401 is configured to obtain a prestored value adjustment strategy, and adjust the temperature threshold of the CPU according to the value adjustment strategy; or output operation information about the operation of adjusting the temperature threshold of the CPU and receive an operation result fed back for the operation information to obtain the adjusted temperature threshold.

The adjustment module 401 further includes an output unit.

The output unit is configured to output prompt information about an operations of adjusting data of the temperature threshold when outputting the operation information about the operation of adjusting the temperature threshold of the CPU, where the prompt information includes a direction of adjusting a value of the temperature threshold and a magnitude of adjusting the value of the temperature threshold.

In apparatus embodiments of the present disclosure, in a case of frequent hot plug operations of a CPU, at least one temperature threshold is adjusted so that a trigger condition of a hot plug operation is changed and the number of hot plugs reaches a further value. This overcomes a problem of frequent enabling and disabling of at least one core of the CPU in the related art, ensures rational use of CPU resources and ensures system stability.

It will be understood by those of ordinary skill in the art that all or part of the steps in the above-mentioned embodiments may be implemented using one or more computer programs. The computer programs may be stored in a computer readable storage medium and executed on a corresponding hardware platform (e.g., system, device, apparatus or component). During the execution of these programs, one of or a combination of the steps in the above-mentioned method embodiments is implemented.

Alternatively, all or part of the steps in the above-mentioned embodiments may also be implemented using one or more integrated circuits. These steps may be made into integrated circuit modules separately, or part of these modules or steps may be made into a single integrated circuit module for implementation.

The various devices/function modules/function units in the above-mentioned embodiments may be implemented on a general-purpose computing device. They may be concentrated on a single computing device or distributed over a network composed of multiple computing devices.

The various devices/function modules/function units in the above-mentioned embodiments are implemented by software function modules, and can be stored in a computer-readable storage medium when sold or used as stand-alone products. The above-mentioned computer-readable storage medium may be a read-only memory, a magnetic disk or an optical disk, etc.

INDUSTRIAL APPLICABILITY

In embodiments of the present disclosure, in a case of frequent hot plug operations of a CPU, at least one temperature threshold is adjusted so that a trigger condition of a hot plug operation is changed and the number of hot plugs reaches a further value. This overcomes a problem of frequent enabling and disabling of at least one core of the CPU in the related art, ensures rational use of CPU resources and ensures system stability.

What is claimed is:

1. A method for controlling a hot plug operation of a CPU in a mobile terminal, comprising:
    dynamically adjusting at least one temperature threshold of a CPU in response to detecting that a number of hot plug operations of the CPU within each preset period of a plurality of successive preset periods is greater than a preset threshold, wherein the temperature threshold is used for controlling the hot plug operation of the CPU; and
    controlling the hot plug operation of the CPU based on the adjusted temperature threshold,
    wherein the method is performed by a processor.

2. The method of claim 1, wherein adjusting the at least one temperature threshold of the CPU comprises:
    adjusting at least one of a temperature threshold T1 and a temperature threshold T2 of the CPU, wherein each of the temperature threshold T1 and the temperature threshold T2 is greater than 0, and the temperature threshold T1 is less than the temperature threshold T2.

3. The method of claim 1, wherein adjusting the at least one temperature threshold of the CPU comprises:
    decreasing a temperature threshold T1 of the CPU and/or increasing a temperature threshold T2 of the CPU, wherein each of the temperature threshold T1 and the temperature threshold T2 is greater than 0, and the temperature threshold T1 is less than the temperature threshold T2.

4. The method of claim 1, wherein adjusting the at least one temperature threshold of the CPU comprises at least one of:
    adjusting the temperature threshold of the CPU according to a preset local value adjustment strategy; or
    outputting operation information about an operation of adjusting the temperature threshold of the CPU, and receiving an operation result fed back for the operation information to obtain the adjusted temperature threshold.

5. The method of claim 4, wherein outputting the operation information about the operation of adjusting the temperature threshold of the CPU comprises:
    outputting prompt information about an operation of adjusting data of the temperature threshold, wherein the prompt information comprises a direction of adjusting a value of the temperature threshold and a magnitude of adjusting the value of the temperature threshold.

6. An apparatus for controlling a hot plug operation of a CPU in a mobile terminal, comprising:
    a processor; and
    a non-transitory computer storage memory storing computer-executable instructions that when executed by the processor, cause the processor to:
        dynamically adjust at least one temperature threshold of a CPU in response to detecting that a number of hot plug operations of the CPU within each preset period of a plurality of successive preset periods is greater than a preset threshold, wherein the temperature threshold is used for controlling the hot plug operation of the CPU; and
        control the hot plug operation of the CPU based on the adjusted temperature threshold.

7. The apparatus of claim 6, wherein the instructions further cause the processor to:
    adjust at least one of a temperature threshold T1 and a temperature threshold T2 of the CPU, wherein each of the temperature threshold T1 and the temperature threshold T2 is greater than 0, and the temperature threshold T1 is less than the temperature threshold T2.

8. The apparatus of claim 6, wherein the instructions further cause the processor to:
    decrease a temperature threshold T1 of the CPU and/or increase a temperature threshold T2 of the CPU, wherein each of the temperature threshold T1 and the temperature threshold T2 is greater than 0, and the temperature threshold T1 is less than the temperature threshold T2.

9. The apparatus of claim 6, wherein the instructions further cause the processor to:
    obtain a prestored value adjustment strategy, and adjust the temperature threshold of the CPU according to the prestored value adjustment strategy; or
    output operation information about an operation of adjusting the temperature threshold of the CPU and receive an operation result fed back for the operation information to obtain the adjusted temperature threshold.

10. The apparatus of claim 9, wherein the instructions further cause the processor to:
    output the operation information about the operation of adjusting the temperature threshold of the CPU, wherein outputting the operation information about the operation of adjusting the temperature threshold of the CPU comprises outputting prompt information about an operation of adjusting data of the temperature threshold, and wherein the prompt information comprises a direction of adjusting a value of the temperature threshold and a magnitude of adjusting the value of the temperature threshold.

11. A non-transitory computer-readable storage medium storing computer-executable instructions that, when executed by a processor, cause the processor to perform a method for controlling a hot plug operation of a CPU in a mobile terminal,
    wherein the method comprises:
    dynamically adjusting at least one temperature threshold of a CPU in response to detecting that a number of hot plug operations of the CPU within each preset period of a plurality of successive preset periods is greater than a preset threshold, wherein the temperature threshold is used for controlling the hot plug operation of the CPU; and
    controlling the hot plug operation of the CPU based on the adjusted temperature threshold.

12. The non-transitory computer-readable storage medium of claim 11, wherein adjusting the at least one temperature threshold of the CPU comprises:
    adjusting at least one of a temperature threshold T1 and a temperature threshold T2 of the CPU, wherein each of the temperature threshold T1 and the temperature threshold T2 is greater than 0, and the temperature threshold T1 is less than the temperature threshold T2.

13. The non-transitory computer-readable storage medium of claim 11, wherein adjusting the at least one temperature threshold of the CPU comprises:

decreasing a temperature threshold T1 of the CPU and/or increasing a temperature threshold T2 of the CPU, wherein each of the temperature threshold T1 and the temperature threshold T2 is greater than 0, and the temperature threshold T1 is less than the temperature threshold T2.

14. The non-transitory computer-readable storage medium of claim 12, wherein adjusting the at least one temperature threshold of the CPU comprises:
decreasing a temperature threshold T1 of the CPU and/or increasing a temperature threshold T2 of the CPU, wherein each of the temperature threshold T1 and the temperature threshold T2 is greater than 0, and the temperature threshold T1 is less than the temperature threshold T2.

15. The non-transitory computer-readable storage medium of claim 11, wherein adjusting the at least one temperature threshold of the CPU comprises at least one of:
adjusting the temperature threshold of the CPU according to a preset local value adjustment strategy; or
outputting operation information about an operation of adjusting the temperature threshold of the CPU, and receiving an operation result fed back for the operation information to obtain the adjusted temperature threshold.

16. The non-transitory computer-readable storage medium of claim 15, wherein outputting the operation information about the operation of adjusting the temperature threshold of the CPU comprises:
outputting prompt information about an operation of adjusting data of the temperature threshold, wherein the prompt information comprises a direction of adjusting a value of the temperature threshold and a magnitude of adjusting the value of the temperature threshold.

17. The method of claim 2, wherein adjusting the at least one temperature threshold of the CPU comprises:
decreasing a temperature threshold T1 of the CPU and/or increasing a temperature threshold T2 of the CPU, wherein each of the temperature threshold T1 and the temperature threshold T2 is greater than 0, and the temperature threshold T1 is less than the temperature threshold T2.

18. The apparatus of claim 7, wherein the instructions further cause the processor to:
decrease a temperature threshold T1 of the CPU and/or increase a temperature threshold T2 of the CPU, wherein each of the temperature threshold T1 and the temperature threshold T2 is greater than 0, and the temperature threshold T1 is less than the temperature threshold T2.

* * * * *